United States Patent Office 3,511,594
Patented May 12, 1970

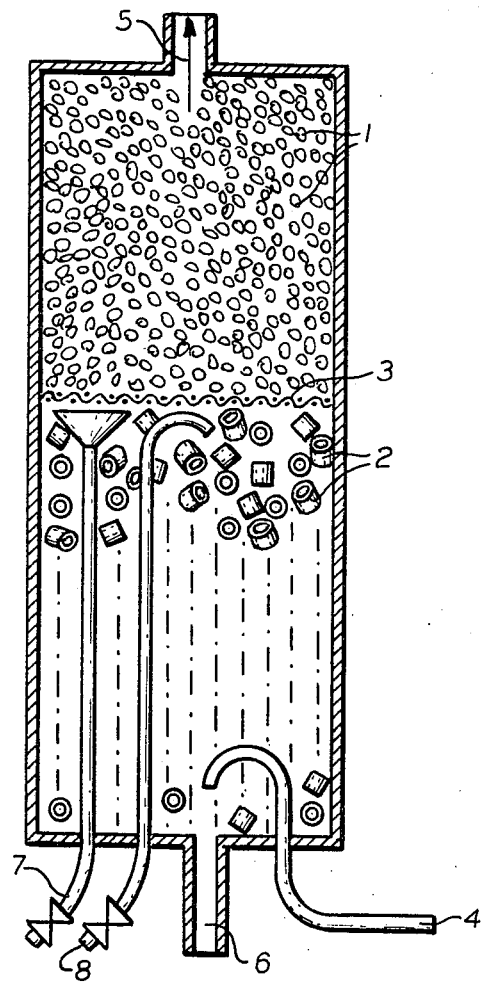

3,511,594
DRYING OF GASES
Arnold Lenz, Cologne-Stammheim, and Walter Rogler, Ranzel, Troisdorf, Germany, assignors to Dynamit Nobel Aktiengesellschaft, Troisdorf, Germany
Filed Nov. 21, 1967, Ser. No. 684,839
Claims priority, application Germany, Nov. 28, 1966, D 51,660
Int. Cl. B01d 47/00, 53/14
U.S. Cl. 23—2
1 Claim

ABSTRACT OF THE DISCLOSURE

Process of drying air or other gases by passing the gas into contact with alkali wherein the gas is passed through a first zone having aqueous alkali solution therein and then through a second zone having granular alkali material. In a preferred embodiment, the aqueous alkali is the product formed when the gas is dried by the granular alkali.

---

It is known to dry air or other gases by contacting them with solid, preferably granular, alkali, e.g., caustic soda or caustic potash. In the process it is usual to use a drying tower having the alkali granules therein and to pass the gas to be dried into the bottom of the tower. The gas flows through the alkali bed and is recovered in a dried condition from the top of the tower.

This method can be used whenever the gas being dried does not react with the drying agent. The effectiveness of the drying action depends on the grain size of the alkali hydroxide and on the residence time of the gas in contact with the drying agent. In this drying process the moisture in the gas is absorbed by the drying agent, the latter being gradually dissolved.

It is an object of this invention to provide a novel process for drying gases.

It is another object of this invention to provide an improved process for drying gases and simultaneously to remove certain components of the gas.

Other and additional objects of this invention will become apparent from a consideration of this entire specification including the drawings and claims hereof.

In accord with and fulfilling these objects, one aspect of this invention comprises a gas drying process, including providing two zones, a first zone containing aqueous alkali solution and a second zone containing granular alkali metal hydroxide; passing the gas to be dried first through the aqueous solution-containing zone and thence through the granular alkali-containing zone; and recovering dried gas from said second zone.

In a preferred form of this invention, the zone containing aqueous alkali solution is filled with packing, e.g., Raschig rings, Berl saddles, etc., suitably made of glass or some other substantially inert material. This first zone is disposed below the above-referred to second zone. Both zones are suitably contained in a single tower, preferably separated by wire screening or other like separation means, which will permit the passage of both gas and liquid but will effectively restrain solid alkali from passing therethrough. In operation the preferred embodiment of this invention provides as the aqueous alkali solution of the first zone, the alkali which is dissolved by the water dried out of the gas in the second zone. This aqueous solution, which is created in the second, solid alkali-containing zone, flows down through the separation means and over the packing in the first zone. This flow is countercurrent to the gas passing through the first zone. In the first zone then the entering gas is predried, whereby the alkali solution is diluted.

Thus, the subject of this invention is a process for drying gases with alkali hydroxides, wherein the gases are made to flow up from the bottom through a tower whose upper zone is provided with granulated alkali hydroxide, and whose lower zone is provided with packing, so that the gas first comes in contact with the concentrated alkali lye draining down from the upper zone through the packing after a period of time in operation.

The alkali lye absorbs the moisture from the inflowing gas until the water vapor pressure of the lye is in equilibrium with that of the incoming gas. The gas is in this manner free of most of its moisture before it comes into contact with the granulated alkali hydroxide in the upper zone. The packing in the lower zone creates large contact areas between the downwardly seeping lye and the gas, thereby increasing the effectiveness of the drying and making more efficient use of the drying agent than hitherto.

Another embodiment of this invention lies in the fact that, simultaneously with the preliminary drying, contaminants contained in the gas which react with alkali lyes, such as $CO_2$, $CL_2$, HCl, or $SO_2$, are removed from the gas. This purification is desirable in many cases, and most necessary in some, because heavily contaminated gases can result in the precipitation of insoluble salts in the drying tower. If the lye is too highly concentrated in the bottom zone due to excessively low gas moisture or too short a retention of the gas in the bottom zone— meaning that too little water is being absorbed by the lye—the contaminated gas has to be moisturized before it enters the tower by passing it through water. Otherwise the contaminants are not entirely absorbed by the lye, since their solubility in the lye decreases as the concentration of the lye increases. Excellent operating conditions will be present in the installation when in the bottom zone of the tower the lye runs out clear without the formation of salts on the packing, and the gas is predried before entering the upper zone to such an extent that its dewpoint is equal to the dewpoint of the gas phase which is in equilibrium with the concentrated lye.

Understanding of this invention will be facilitated by reference to the accompanying drawing, which is a schematic vertical view of a drying tower in accord with this invention.

Referring now to this drawing, an upper zone 1 of the drying tower is shown filled with granulated alkali hydroxide and a lower zone 2 is shown filled with packing bodies. The two zones are separated from one another by a wire screen 3. A portion of the moisture of the gas entering at 4 is absorbed by the alkali lye seeping down onto the packing bodies from the upper zone, and the other portion is absorbed by the granulated alkali hydroxide in the upper zone. The gas departs from the tower at 5. The dilute lye flows out at the bottom end of the tower at 6.

This invention will be illustrated by the following examples which are in no way to be construed as limiting the scope hereof.

EXAMPLE 1

A glass tube 1.50 m. long having an inside diameter of 60 mm. is filled to a depth of 60 cm. with Raschig rings (10 x 10 mm.) and, on top of the screen to a depth of an additional 90 cm., with large pieces of potassium hydroxide. The pieces of potassium hydroxide are separated from the Raschig rings by a wire screen having a mesh size of 1 mm. The gas to be dried, air, is introduced at the bottom end of the tower with a dewpoint of 29° C., corresponding to a moisture content of 29 g./m.$^3$.

At a rate of air flow of 700 l./h., corresponding to a velocity of flow of 6 cm./sec. with reference to the empty tube, air is discharged at the upper end of the tower having a dewpoint of —41° C., corresponding to a moisture content of 0.1 g./m.$^3$. The clear lye discharged from the lower zone contains 17% KOH. A gas phase that is in equilibrium with this concentration has a moisture content of about 29 g./m.$^3$. Lye and gas specimens are taken at the interface between the Raschig rings and the potassium hydroxide (see the drawing at 7 and 8, respectively). The lye draining out of the potassium hydroxide pellets contains 60% KOH. At this point the gas has a moisture content of 1.8 g./m.$^3$. Consequently, by drying with caustic potash solution, moist air containing 29 g. $H_2O$ per cubic meter is predried to a moisture content of 1.8 g. $H_2O$ per cubic meter, i.e., 90% of the moisture in the gas is absorbed by the lye.

EXAMPLE 2

The rate of air flow is increased to 1800 l./h. under conditions remaining otherwise the same as in Example 1. The dewpoint of the emerging gas increases to —15° C., while the exiting lye concentration increases to 39% KOH. In other words, the retention time in both zones has been too short, i.e., the optimum absorption of moisture by the lye and the caustic potash has not been achieved.

After a short time of operation, a white coating forms in the upper and lower zones which, after a number of hours, concentrates to such an extent that the pressure in the gas inlet starts to rise. The $CO_2$ content in the air has produced a carbonate precipitation, because, due to the increased lye concentration in the lower zone, the solubility of the $K_2CO_3$ is exceeded. After the rate of air flow has been reduced back to 700 l./h., the carbonate precipitate partially dissolves again in the lower zone. The lye becomes diluted again to about 17% due to the increased time of retention of the moist gas in the lower zone.

EXAMPLE 3

The drying tower, as described in Example 1, is filled with a mixture of pellets of NaOH and KOH instead of KOH pellets only.

Air, at a flow rate of 700 l./h., with a dewpoint in the air prior to entry amounting again to 29° C.=29 g. of water per cubic meter, is discharged at the head of the drying column having a dewpoint of —41° C.=0.1 g. $H_2O$/m.$^3$. The outflowing clear lye has a content of 17.5% NaOH/KOH.

The transition from the solid to the liquid state no longer takes place as sharply with the NaOH/KOH mixture as it did with the KOH pellets, since the NaOH deliquesces through a number of hydrate stages.

The lye seeping downward contains approximately 55% NaOH/KOH. The air at screen has a dewpoint of —7° C.=2.6 g. $H_2O$/m.$^3$.

By drying with NaOH/KOH lye it is possible to predry a moist gas containing for example, 29 g./m.$^3$ to a dewpoint of —7° C.=2.6 g. $H_2O$/m.$^3$, corresponding to a better than 90% drying of the gas.

EXAMPLE 4

If the rate of air flow is raised to 1800 l./h., under conditions remaining otherwise the same as in Example 3, the dewpoint of the effluent gas increases to —13° C., while the effluent lye concentration increases to 40.5% NaOH/KOH.

Here again the retention time has been too short for the moisture exchange. After a number of hours of running time a carbonate precipitate forms in the upper and lower zones. The pressure increases.

Here again the lye concentration is so high that the $CO_2$ contamination does not completely dissolve in the lye.

By reducing the rate of air flow back to 700 l./h., the precipitate was partially dissolved by the dilute lye.

EXAMPLE 5

The drying tower is filled with pieces of NaOH under the same conditions as in Examples 1 and 3. At an air flow rate of 700 l./h., the effluent air again has a dewpoint of —41° C. The effluent lye contains 16.5% NaOH, the same as in Examples 1 and 3. It is slightly turbid because the $Na_2CO_3$ solubility in NaOH is poorer than the $K_2CO_3$ solubility in KOH, and the solubility product of the $Na_2CO_3$ is already exceeded.

The deliquescence point of the NaOH is broad, and the lye that drains out is an approximately 50% soda lye. At the screen the air has a dewpoint of —1.5° C., corresponding to a moisture content of about 4 g. of water per cubic meter.

By the soda lye drying it is possible to reduce moist gas containing, for example, 29 g. $H_2O$/m.$^3$, to a moisture content of 4 g. $H_2O$/m.$^3$, which corresponds to a predrying of better than 80%.

EXAMPLE 6

If the rate of air flow is raised to 1800 l./h. under conditions remaining otherwise the same as in Examples 2 and 4 the dewpoint of the effluent gas drops to —13.5° C. while the effluent lye increases to 40% NaOH. Here again, the shorter detention time is not sufficient for the maximum drying of the gas.

On account of an excessively high lye concentration in the lower zone, the $CO_2$ does not dissolve in the NaOH and precipitates as $Na_2CO_3$. The pressure likewise rises at the gas inlet.

Although the rate of air flow is reduced to 700 l./h. and after a while the lye flows out thinner, only barely perceptible amounts of the precipitate dissolve out again.

Examples 2, 4 and 6 show that if the lye concentration becomes too high, on account of excessively short detention time or excessively dry gasses, the drying tower may become clogged by the formation of salts if there are salt-forming components in the gas being dried.

What is claimed is:

1. An improved process for drying and neutralizing a gas containing moisture and acidic components by contacting such with alkali metal hydroxides comprising providing two vertically aligned zones, the lower of which contains packing and an aqueous solution of alkali metal hydroxide and the upper of which contains solid alkali metal hydroxide wherein said zones are separated by a screen means; introducing gas to be dried and neutralized into the lower portion of said lower zone; passing such gas through said lower zone in contact with said aqueous solution of alkali metal hydroxide to remove a portion of the moisture and neutral said gas stream and thence through said screen; passing the gas emerging from said screen through said upper zone in contact with said solid alkali metal hydroxide to remove substantially all of the remaining moisture in said gas stream and thence removing said gas in a dried and neutralized condition; wherein said aqueous solution of alkali metal hydroxide is provided to said lower zone solely as a result of water from said gas dissolving a portion of said solid alkali metal hydroxide in said upper zone and the aqueous solution thus formed passing downwardly through said screen into said lower zone; wherein the residence time of said gas in said lower zone is such that substantially no precipitate is formed in said aqueous solution of alkali metal hydroxide; and wherein the dew point of said gas emerging from said screen in initial contact with said solid alkali metal hydroxide has a dew point which is substantially equal to the dew point of the gas in equilibrium with said aqueous solution of alkali metal hydroxide immediately below said screen.

References Cited

UNITED STATES PATENTS

| | | | |
|---|---|---|---|
| 1,596,060 | 8/1926 | Mase | 55—35 |
| 2,678,261 | 5/1954 | Ruth | 60—30 |
| 3,050,920 | 8/1962 | Norton | 55—35 |
| 3,386,228 | 6/1968 | Hartmann | 55—68 |
| 2,761,755 | 9/1956 | Brown | 23—2 |

REUBEN FRIEDMAN, Primary Examiner

C. N. HART, Assistant Examiner

U.S. Cl. X.R.

55—30